(12) United States Patent  
Uno

(10) Patent No.: US 10,431,015 B2  
(45) Date of Patent: Oct. 1, 2019

(54) REMOTE VEHICLE DATA COLLECTION SYSTEM

(71) Applicant: TOYOTA JIDOSHA KABUSHIKI KAISHA, Toyota-shi, Aichi-ken (JP)

(72) Inventor: Satoshi Uno, Tokyo (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/522,172

(22) PCT Filed: Nov. 27, 2015

(86) PCT No.: PCT/JP2015/005919  
§ 371 (c)(1),  
(2) Date: Apr. 26, 2017

(87) PCT Pub. No.: WO2016/116978  
PCT Pub. Date: Jul. 28, 2016

(65) Prior Publication Data  
US 2017/0330391 A1   Nov. 16, 2017

(30) Foreign Application Priority Data  
Jan. 20, 2015   (JP) ................. 2015-008487

(51) Int. Cl.  
*H04Q 9/00* (2006.01)  
*G07C 5/00* (2006.01)

(52) U.S. Cl.  
CPC .............. *G07C 5/008* (2013.01); *H04Q 9/00* (2013.01); *H04Q 2209/40* (2013.01)

(58) Field of Classification Search  
CPC ....... G07C 5/008; H04Q 9/00; H04Q 2209/40  
USPC .................................................... 340/870.07  
See application file for complete search history.

(56) References Cited

U.S. PATENT DOCUMENTS

| | | | | |
|---|---|---|---|---|
| 5,565,856 A | * | 10/1996 | Takaba ................. | G01R 31/007 340/3.1 |
| 5,697,048 A | * | 12/1997 | Kimura ................. | H04B 1/205 348/E7.051 |
| 2003/0050747 A1 | * | 3/2003 | Kamiya ................. | G07C 5/008 701/33.4 |

(Continued)

FOREIGN PATENT DOCUMENTS

| | | |
|---|---|---|
| CN | 103189577 A | 7/2013 |
| CN | 103348388 A | 10/2013 |

(Continued)

*Primary Examiner* — Daniell L Negron  
*Assistant Examiner* — Kam Wan Ma  
(74) *Attorney, Agent, or Firm* — Hunton Andrews Kurth LLP

(57) ABSTRACT

A center prescribes, to a subject vehicle through wireless communication, at least one of a type of vehicle data to be collected, a conditional expression used when collecting the vehicle data, a sampling cycle when collecting the vehicle data, and a checking cycle of the conditional expression. A center-side checking section checks, based on its own check criterion, appropriateness of at least one of the type of the vehicle data, the conditional expression, the sampling cycle, and the checking cycle. A vehicle-side checking section checks whether the resources of the subject vehicle are appropriate when the vehicle data is collected based on the prescription from the center.

8 Claims, 6 Drawing Sheets

(56) References Cited

U.S. PATENT DOCUMENTS

| | | | | |
|---|---|---|---|---|
| 2011/0130905 A1* | 6/2011 | Mayer | | G07C 5/008 |
| | | | | 701/22 |
| 2012/0271507 A1* | 10/2012 | Umesaka | | G07C 5/0816 |
| | | | | 701/33.2 |
| 2013/0110344 A1 | 5/2013 | Merg et al. | | |
| 2013/0179612 A1* | 7/2013 | Feekes | | G06F 13/42 |
| | | | | 710/106 |
| 2013/0218370 A1 | 8/2013 | Kim | | |
| 2013/0305000 A1* | 11/2013 | Sakamoto | | G06F 12/00 |
| | | | | 711/154 |
| 2013/0317692 A1 | 11/2013 | Iga | | |
| 2014/0279707 A1* | 9/2014 | Joshua | | G06Q 30/0283 |
| | | | | 705/400 |
| 2015/0169662 A1* | 6/2015 | Hills | | G06F 17/30339 |
| | | | | 707/609 |
| 2016/0225197 A1* | 8/2016 | Oda | | G07C 5/008 |
| 2017/0339056 A1* | 11/2017 | Uno | | G07C 5/008 |
| 2017/0352261 A1* | 12/2017 | Hasegawa | | G08G 1/0112 |

FOREIGN PATENT DOCUMENTS

| | | |
|---|---|---|
| EP | 1870788 A1 | 12/2007 |
| JP | H10-222529 A | 8/1998 |
| JP | 2003-296135 A | 10/2003 |
| JP | 2006-283651 A | 10/2006 |
| WO | 2012/107828 A1 | 8/2012 |

\* cited by examiner

Fig.2

| Vehicle Type | AA Conditional Expression | | A3 Range of Set Value | C1 Checking Cycle Settable Lower Limit of Checking Cycle | B Data Item to be Acquired | | C2 Sampling Cycle Settable Lower Limit of Sampling Cycle | B Data Item to be Acquired | | C2 Sampling Cycle Settable Lower Limit of Sampling Cycle |
|---|---|---|---|---|---|---|---|---|---|---|
| | A1 Variable | A2 Presence/Absence | | | B1 CAN data type | B3 Presence/Absence | | B2 ECU Internal Value Type | B4 Presence/Absence | |
| Type A | ACC signal | ○ | ON or OFF | Tc1 | ACC signal | ○ | Ts1 | VSC Sport Mode | × | Ts3 |
| | Vehicle Speed | ○ | 0 or greater | Tc2 | Vehicle Speed | ○ | Ts2 | ... | ... | ... |
| | ... | ... | ... | ... | ... | ... | ... | ... | ... | ... |
| Type B | ACC signal | × | ON or OFF | Tc1 | ACC signal | × | Ts1 | VSC Sport Mode | × | Ts3 |
| | Vehicle Speed | ○ | 0 or greater | Tc2 | Vehicle Speed | ○ | Ts2 | ... | ... | ... |
| | ... | ... | ... | ... | ... | ... | ... | ... | ... | ... |
| Type C | ACC signal | ○ | ON or OFF | Tc1 | ACC signal | ○ | Ts1 | VSC Sport Mode | ○ | Ts3 |
| | Vehicle Speed | ○ | 0 or greater | Tc2 | Vehicle Speed | ○ | Ts2 | ... | ... | ... |
| | ... | ... | ... | ... | ... | ... | ... | ... | ... | ... |
| ... | ... | ... | ... | ... | ... | ... | ... | ... | ... | ... |

| Vehicle Data | Vehicle ECU from which vehicle data is collected | Network Identification Value |
|---|---|---|
| Brake Pedal Depression Amount | Brake ECU | CAN-ID1 |
| Vehicle Speed | | |
| Number of Times of IG-ON | Body ECU | CAN-ID2 |
| Accelerator Pedal Depression Amount | Engine ECU | CAN-ID3 |
| Steering Wheel Operation Amount | Steering ECU | CAN-ID4 |

T2

Described in script: Vehicle Speed, Number of Times of IG-ON

REMOTE VEHICLE DATA COLLECTION SYSTEM

CROSS-REFERENCE TO RELATED APPLICATIONS

This is a national phase application based on the PCT International Patent Application No. PCT/JP2015/005919 filed Nov. 27, 2015, claiming priority to Japanese Patent Application No. 2015-008487 filed Jan. 20, 2015, the entire contents of both of which are incorporated herein by reference.

TECHNICAL FIELD

The present disclosure relates to a remote vehicle data collection system that remotely collects vehicle data. The remote vehicle data collection system collects vehicle data in response to a request via a center.

BACKGROUND ART

Conventionally, the system disclosed in Patent Document 1 is known as such a system. The center of the system prescribes transmission condition to a vehicle in advance. When the transmission condition is met in the vehicle, vehicle data is transmitted to the center from the vehicle. Specifically, when the transmission condition is met in the vehicle, the data transmission buffer of the vehicle stores vehicle data prescribed as a data item to be acquired. Then, the vehicle data stored in the data transmission buffer is transmitted to the center from the vehicle either periodically or in response to a request from the center.

CITATION LIST

Patent Literature

PLT 1: Japanese Laid-Open Patent Publication No. 2006-283651

SUMMARY

Technical Problem

In the system disclosed in the above document, if a prescription for collecting vehicle data is not appropriate, vehicle data in accordance with the request from the center may not be transmitted to the center. For example, if the prescribed data item to be acquired does not exist on the part of the vehicle, the prescription for collecting vehicle data is not proper for the vehicle. It is needless to say that such a situation is preferably avoided.

Accordingly, it is an objective of the present disclosure to provide a remote vehicle data collection system that properly collects vehicle data in response to a request from a center.

Means for Solving the Problems

In accordance with one aspect of the present disclosure, a remote vehicle data collection system including a center that manages traveling information of a plurality of vehicles is provided. The center is configured to prescribe, to a subject vehicle through wireless communication, at least one of a type of vehicle data to be collected, a conditional expression used when collecting the vehicle data, a sampling cycle when collecting the vehicle data, and a checking cycle of the conditional expression. The center is configured to read, through wireless communication, the vehicle data collected based on the prescription. The center includes a check criterion and a center-side checking section. The center-side checking section is configured to check, based on the check criterion, appropriateness of at least one of the type of the vehicle data, the conditional expression, the sampling cycle, and the checking cycle that is prescribed to the subject vehicle. The subject vehicle includes a vehicle-side checking section, which is configured to check whether resources of the subject vehicle are appropriate. The vehicle-side checking section is configured to check whether the resources of the subject vehicle are appropriate when the vehicle data is collected based on the prescription from the center.

When the type of vehicle data to be collected, the conditional expression for collecting vehicle data, the sampling cycle for collecting vehicle data, and the checking cycle for the conditional expression are checked for appropriateness for the subject vehicle, the check criterion for appropriateness must be prepared for each vehicle type. Particularly, when the types of vehicle data to be collected vary in a wide range or when the conditional expression for collecting vehicle data is desired to be flexible, the amount of data for check criterion tends to be great. In this regard, the above described configuration is designed such that the center checks, based on its own check criterion, appropriateness of at least one of the type of vehicle data, the conditional expression, the sampling cycle, and the checking cycle. Therefore, at such a checking operation, the above described check criterion need not be transmitted between the center and the subject vehicle. On the other hand, when it is checked whether resources of the subject vehicle at collection of vehicle data based on an instruction from the center are appropriate, the resources of the subject vehicle at that time need to be obtained. The resources of the subject vehicle, however, can be obtained on the part of the subject vehicle. Since the above described configuration is designed to check the resources of the subject vehicle on the part of the subject vehicle, the resources of the subject vehicle at the time of a checking operation need not be transmitted between the center and the subject vehicle. That is, in any of the above checking operations, transmission between the subject vehicle and the center is not necessary. Thus, the vehicle data is reliably collected in response to a request via the center, while suppressing influences on the communication environment of the vehicle.

The above described remote vehicle data collection system is preferably configured such that the center has a database as the check criterion. The database is preferably configured to associate the type of the subject vehicle with a type of vehicle data that is collectable in a vehicle of the type of the subject vehicle. The center-side checking section is preferably configured to identify, based on the database, a type of vehicle data that corresponds to the type of the subject vehicle. The center-side checking section is preferably configured to determine that "the type of the vehicle data is appropriate" on condition that the identified type of vehicle data agrees with the type of the vehicle data that has been prescribed as a subject to be collected to the subject vehicle.

With the above configuration, using its own database, which is the check criterion, the center can check whether it is possible to obtain the type of vehicle data that has been prescribed to be collected by the center.

The above described remote vehicle data collection system is preferably configured such that the database is configured to associate a range of possible values of the vehicle data with the type of the vehicle data, and the center-side checking section is configured to identify, based on the database, a range of possible values of the vehicle data to be collected from the type of the subject vehicle. Also, the center-side checking section is preferably configured to determine that "the conditional expression of the vehicle data is appropriate" on condition that a data value range of the vehicle data that satisfies the conditional expression prescribed to the subject vehicle is within the identified range.

With the above configuration, using its own database, which is the check criterion, the center can check whether the conditional expression prescribed by the center is appropriate for the subject vehicle.

The above described remote vehicle data collection system is preferably configured such that the database is configured to associate a settable range of the checking cycle with the conditional expression, and the center-side checking section is configured to identify, based on the database, the settable range of the checking cycle in the conditional expression that corresponds to the type of the subject vehicle. Also, the center-side checking section is preferably configured to determine that "the checking cycle is appropriate" on condition that the checking cycle prescribed to the subject vehicle is within the identified range.

With the above configuration, using its own database, which is the check criterion, the center can check whether the checking cycle prescribed by the center is appropriate for the subject vehicle.

The above described remote vehicle data collection system is preferably configured such that the database is configured to associate a settable range of the sampling cycle with the type of the vehicle data, and the center-side checking section is configured to identify, based on the database, the settable range of the sampling cycle for the type of the vehicle data that corresponds to the type of the subject vehicle. Also, the center-side checking section is preferably configured to determine that "the sampling cycle is appropriate" on condition that the sampling cycle prescribed to the subject vehicle is within the identified range.

With the above configuration, using its own database, which is the check criterion, the center can check whether the sampling cycle prescribed by the center is appropriate for the subject vehicle.

The above described remote vehicle data collection system is preferably configured such that the subject vehicle has at least one of a memory and a storage, and the resources of the subject vehicle checked by the vehicle-side checking section are configured to include an amount of space in at least one of the memory and the storage.

For example, if the memory or the storage of the subject vehicle does not have a sufficient amount of space for storing the vehicle data collected based on an instruction from the center, such vehicle data cannot be collected from the subject vehicle. Thus, with the above configuration, the amount of space of the memory or the storage is checked on the part of the subject vehicle before collecting vehicle data. Therefore, the vehicle data is properly collected in response to a request via the center.

The above described remote vehicle data collection system is preferably configured such that the subject vehicle has a vehicle network, and the resources of the subject vehicle checked by the vehicle-side checking section are configured to include a bus occupancy of the vehicle network.

To prevent the bus occupancy of the vehicle network from being excessive at collection of vehicle data based on an instruction from the center, the collection of vehicle data through the vehicle network is suspended in some cases until the bus occupancy of the vehicle network is sufficiently lowered when the bus occupancy is likely to be excessive. That is, when a situation occurs in which the bus occupancy will be excessive, it may be impossible to quickly collect vehicle data in response to a request via the center. In this regard, with the above configuration, the bus occupancy of the vehicle network is checked on the part of the subject vehicle before collecting vehicle data. Therefore, vehicle data is properly and quickly collected in response to a request via the center.

The above described remote vehicle data collection system is preferably configured such that a script that describes one or more commands is configured to designate a collection condition of the vehicle data.

With the above configuration, highly flexible setting of condition for collecting vehicle data is achieved through input of the script. Since such input of the script broadens the variety of the type of vehicle data, the conditional expression, the sampling cycle, and the checking cycle, which can be prescribed to the subject vehicle, appropriateness of these prescribed items is likely to be a problem in the subject vehicle. The data size of the script and the processing load at execution of the script are also widely varied. Thus, when vehicle data is collected based on the collection condition prescribed by the script, whether the resources of the subject vehicle will be properly maintained is likely to be a problem. In this regard, with the above configuration, since a checking operation is performed both on the part of the center and on the part of the vehicle before vehicle data is collected based on the collection condition prescribed by the script, neither of the above mentioned problems is likely to occur.

The above described remote vehicle data collection system is preferably configured such that the subject vehicle includes a plurality of vehicle mounted control devices, which are connected to a controller area network (CAN), and one or more of the vehicle mounted control devices are configured to collect the vehicle data through communication specified by the CAN protocol.

With the above configuration, vehicle data can be collected by using the versatile CAN protocol, which is widely used in vehicles.

BRIEF DESCRIPTION OF DRAWINGS

FIG. 2 is a diagram showing an example of the content of prescriptions on the database, which is a collectable data table.

DESCRIPTION OF EMBODIMENTS

A remote vehicle data collection system according to one embodiment will now be described with reference to the drawings.

The present embodiment includes subject vehicles, a center that manages traveling information of the vehicles, and an external terminal, which is operated, for example, by an engineer to instruct collection of vehicle data from the vehicles via the center. The external terminal is connected to the center, for example, via an Internet connection and allows a collection condition for vehicle data from the vehicles to be input to the center. The collection condition for vehicle data is preferably set with a high flexibility. In the present embodiment, such highly flexible setting of the collection condition is achieved through inputting of scripts. Scripts refer to strings that describe one or more commands, or instructions, to be executed when vehicle data is collected. When a script input through the external terminal is delivered to a vehicle via the center through wireless communication, commands described in the delivered script are executed on the part of the vehicle, so that vehicle data is collected based on the condition described in the script. Thereafter, the collected data is transmitted to the center through wireless communication, and the transmitted vehicle data is transferred to the external terminal via the center.

Figure 1:
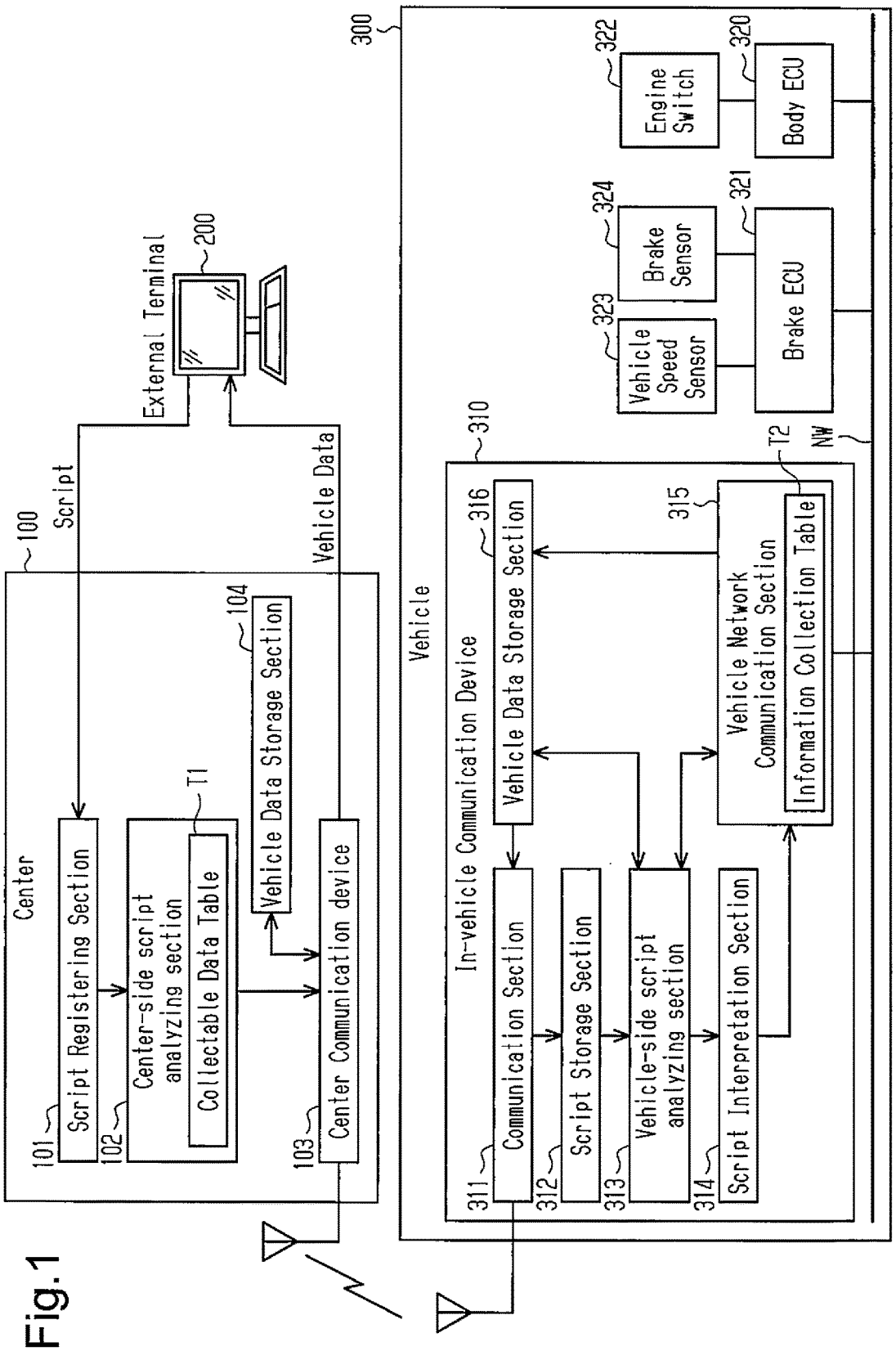
FIG. 1 is a block diagram schematically showing a remote vehicle data collection system according to one embodiment.

Specifically, as shown in FIG. 1, a center 100 includes a script registering section 101, which registers scripts input through an external terminal 200. In the present embodiment, a script is capable of describing the following items (a) to (e).

(a) Conditional expressions, which include a conditional expression for assessing the vehicle inside environment and a conditional expression that is related to expected situations and is used for identifying the vehicle outside environment;

(b) A checking cycle, at which it is determined whether the vehicle data satisfies a conditional expression and images are classified according to the type of scene and checked;

(c) A data collecting period from the start of data collection to the end;

(d) A sampling cycle, at which data is collected into the storage; and (e) Vehicle data, which includes CAN data to be collected and values inside ECUs.

The center 100 includes a center-side script analyzing section 102. The center-side script analyzing section 102 functions as a center-side checking section that analyzes whether a script registered in the script registering section 101 is appropriate for a vehicle 300, which is the subject from which vehicle data is collected. The center-side script analyzing section 102 has a collectable data table T1, which defines a relationship of the types of vehicle with the types of vehicle data and conditional expressions that can be prescribed as collection condition of vehicle data in accordance with vehicle types. On the collectable data table T1, the ranges of possible values of vehicle data are associated with types of vehicle data. That is, the collectable data table T1 is a database serving as a check criterion stored at the center 100. The script registering section 101, the center-side script analyzing section 102, and a vehicle data storage section 104 in the center 100 can be constituted of various types of circuits. For example, these sections can be constituted of a script registering circuit, a center-side script analyzing circuit, and a vehicle data storage circuit.

For example, as shown in FIG. 2, on the collectable data table T1 of the present embodiment, variables A1 for designating signals in transit within the vehicle 300 as determination factors for triggers as conditional expressions AA, presence/absence indicators A2 of the signals designated by the variables A1, and ranges A3 of set values to be compared with the variables A1 in the conditional expressions AA. The range A3 of each set value is a range of possible values of a signal designated as the variable A1. For example, in the example shown in FIG. 2, when an active cruise control signal (ACC signal) is set as a variable A1, the range A3 of the set value corresponding to the ACC signal includes "ON or OFF." Also, when a vehicle speed is set as a variable A1, the range A3 of the set value corresponding to the vehicle speed includes "0 or greater." In this example, a vehicle type A and a vehicle type C have both the ACC signal and the vehicle speed as signals designated by variables A1, while a vehicle type B has only the vehicle speed, but not the ACC signal.

On the collectable data table T1, to improve the reliability of operation of the vehicle ECU when collecting vehicle data, the lower limit of the checking cycle is set for each item of the variable A, which is a determination factor of the conditional expression AA. For example, in the example shown in FIG. 2, Tc1 is set as a lower limit C1 of the checking cycle that can be set for the ACC signal, which is a variable A1, and Tc2 is set as a lower limit C2 of the checking cycle that can be set for the vehicle speed, which is a variable A1.

On the collectable data table T1, the vehicle data type B is divided into CAN data B1, which indicates the type of signal in transit within the vehicle network NW, which is, for example, a controller area network, and an ECU internal value B2, which indicates the types of signals in transit within various vehicle electronic control units (ECUs) connected to the vehicle network NW. On the collectable data table T1, the vehicle data type B and presence/absence indicators B3, B4 of the vehicle data are associated with each other for each vehicle type. For example, in the example of FIG. 2, the type of vehicle data is categorized as the CAN data B1 such as an ACC signal and vehicle speed and the ECU internal value B2 such as a vehicle stability control (VSC) sport mode, which is a driving mode employed mainly in a sports car. Also, in this example, the vehicle type A has CAN data B1 such as an ACC signal and vehicle speed but lacks an ECU internal value B2 such as VSC sport mode. In contrast, the vehicle type B has CAN data B1 such as vehicle speed, but lacks CAN data B1 such as an ACC signal or an ECU internal value B2 such as a VSC sport mode. The vehicle type C has CAN data B1 such as an ACC signal and vehicle speed as well as an ECU internal value B2 such as a VSC sport mode.

On the collectable data table T1, to improve the reliability of operation of the vehicle ECU when collecting vehicle data, the lower limit of the sampling cycle is set for each item of the vehicle data type B. For example, in the example shown in FIG. 2, Ts1 is set as a lower limit C2 of the sampling cycle that can be set for the CAN data B1 such as the ACC signal, and Ts2 is set as a lower limit C2 of the sampling cycle that can be set for the CAN data B1 such as the vehicle speed. In this example, Ts3 is set as a lower limit C2 of the sampling cycle that can be set for the ECU internal value B2 such as the VSC sport mode.

Figure 5:
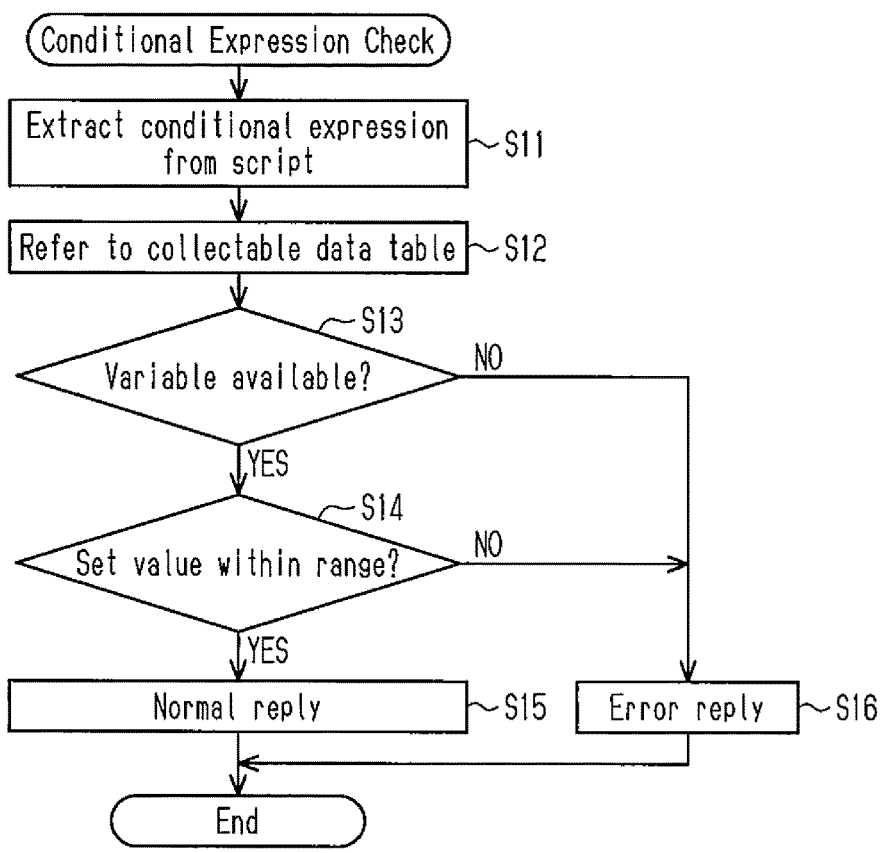
FIG. 5 is a flowchart showing a procedure for a conditional expression check performed by the remote vehicle data collection system according to the embodiment.
Figure 6:
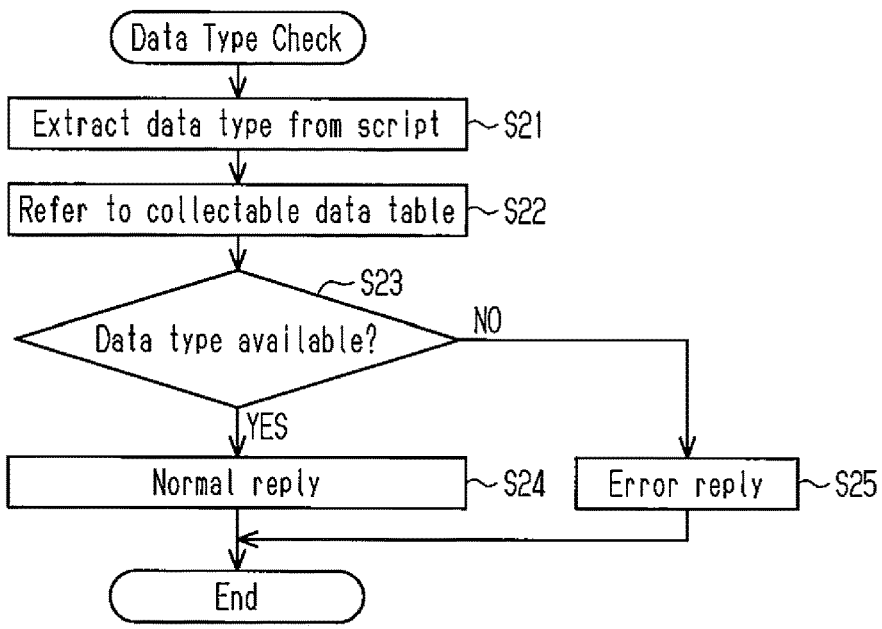
FIG. 6 is a flowchart showing a procedure for a data type check performed by the remote vehicle data collection system according to the embodiment.
Figure 7:
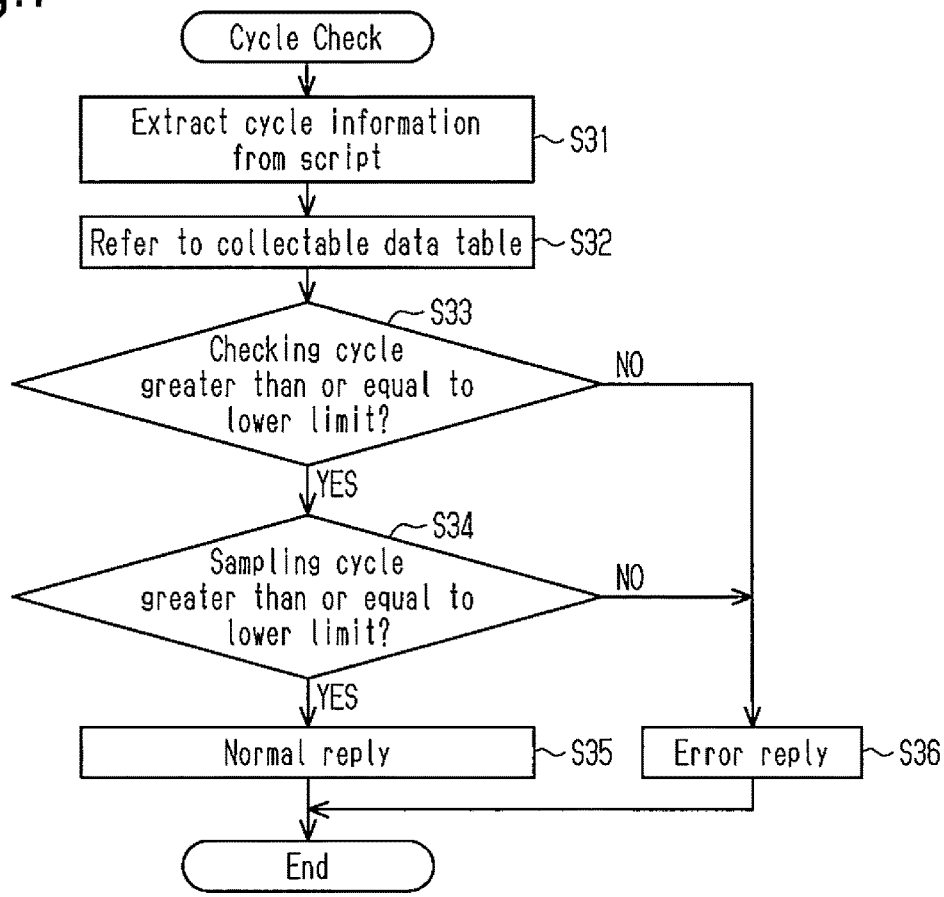
FIG. 7 is a flowchart showing a procedure for a cycle check performed by the remote vehicle data collection system according to the embodiment.

While referring to the above described collectable data table T1, the center-side script analyzing section 102 analyzes appropriateness of a script registered in the script registering section 101 (FIGS. 5, 6, and 7).

That is, when checking appropriateness of the conditional expression designated by the script, the center-side script analyzing section 102 first extracts the conditional expression from the script (step S11 of FIG. 5). Subsequently, while referring to the collectable data table T1, the center-side script analyzing section 102 identifies the corresponding variable A1 from the type of the subject vehicle 300. Based on whether the identified variable A1 agrees with the variable in the conditional expression designated by the script, it is determined whether the variable in the conditional expression is available (step S13 in FIG. 5). If it is determined that the variable in the conditional expression is available (YES at step S13 in FIG. 5), the center-side script analyzing section 102 again refers to the collectable data table T1 and identifies the range A3 of the corresponding set value from the variable of the conditional expression designated by the script. It is determined whether the set value of the conditional expression designated by the script is within the range A3 of the set value (step S14 of FIG. 5).

Thereafter, if the set value of the conditional expression is within the set value range A3 (YES at step S14 of FIG. 5), the center-side script analyzing section 102 determines that the conditional expression designated by the script is appropriate. In contrast, if the variable of the conditional expression is not available (NO at step S13 of FIG. 5) or if the set value of the conditional expression is out of the set value range A3 (NO at step S14 of FIG. 5), the center-side script analyzing section 102 determines that the conditional expression designated by the script is not appropriate.

When checking appropriateness of the type of vehicle data designated by the script, the center-side script analyzing section 102 first extracts the type of vehicle data from the script (step S21 of FIG. 6). Subsequently, while referring to the collectable data table T1, the center-side script analyzing section 102 identifies the corresponding vehicle data type B from the type of the subject vehicle 300. Based on whether the identified vehicle data type B agrees with the type of vehicle data that has been designated to be collected by the script, the center-side script analyzing section 102 determines whether the type of vehicle data that has been designated to be collected by the script is available (step S23 of FIG. 6).

Thereafter, if the type of vehicle data is available (YES at step S23 of FIG. 6), the center-side script analyzing section 102 determines that the type of vehicle data designated by the script is appropriate. In contrast, if the type of vehicle data is not available (NO at step S23 of FIG. 6), the center-side script analyzing section 102 determines that the type of vehicle data designated by the script is not appropriate.

When checking appropriateness of the checking cycles and the sampling cycles designated by the script, the center-side script analyzing section 102 first extracts information regarding these cycles (step S31 of FIG. 7). Subsequently, the center-side script analyzing section 102 identifies the lower limits Tc1, Tc2 of the checking cycles from the variable in the conditional expression designated by the script, while referring to the collectable data table T1. Also, from the type of vehicle data that has been designated to be collected by the script, the center-side script analyzing section 102 calculates the lower limits Ts1, Ts2, Ts3 (step S32 of FIG. 7).

Subsequently, it is determined whether the checking cycles designated by the script are greater than or equal to the lower limits Tc1, Tc2 (step S33 of FIG. 7). When the checking cycles designated by the script are greater than or equal to the lower limits Tc1, Tc2 (YES at step S33 of FIG. 7), the center-side script analyzing section 102 determines whether the sampling cycles designated by the script are greater than or equal to the lower limits Ts1, Ts2, Ts3 (step S34 of FIG. 7).

Thereafter, if the sampling cycles designated by the script are greater than or equal to the lower limits Ts1, Ts2, Ts3 (YES at step S34 of FIG. 7), the center-side script analyzing section 102 determines that the cycle information designated by the script is appropriate. In contrast, if the checking cycles designated by the script are less than the lower limits Tc1, Tc2 (NO at step S33 of FIG. 7) or if the sampling cycles designated by the script are less than the lower limits Ts1, Ts2, Ts3 (NO at step S34 of FIG. 7), the center-side script analyzing section 102 determines that the cycle information designated by the script is not appropriate.

For example, if the subject vehicle 300 is of the vehicle type B and the variable of the conditional expression designated by the script registered in the script registering section 101 is an ACC signal, the script is determined to be inappropriate since the vehicle type B does not include the ACC signal. If the subject vehicle is of the vehicle type C, and the conditional expression designated by the script registered in the script registering section 101 is "vehicle speed<0," the script is determined to be inappropriate since the range A3 of the set value corresponding to the vehicle speed is set to be 0 or greater. If the checking cycle designated by the script falls below Tc1 when the subject vehicle 300 is of the vehicle type A and the variable of the conditional expression designated by the script registered in the script registering section 101 is an ACC signal, the script is determined to be inappropriate. If the subject vehicle 300 is of the vehicle type B and the CAN data that has been designated to be collected by the script registered in the script registering section 101 is an ACC signal, the script is determined to be inappropriate since the vehicle type B does not include the ACC signal. If the subject vehicle is of the vehicle type A and the ECU internal value that has been designated to be collected by the script registered in the script registering section 101 is the VSC sport mode, the script is determined to be inappropriate since the vehicle type A does not include the VSC sport mode. If the sampling cycle designated by the script falls below Ts1 when the subject vehicle 300 is of the vehicle type A and the CAN data that has been designated to be collected by the script registered in the script registering section 101 is an ACC signal, the script is determined to be inappropriate.

When determining that the script is inappropriate, the center-side script analyzing section 102 outputs an error reply to the external terminal 200 via a center communication device 103 (step S16 of FIG. 5, step S25 of FIG. 6, step S36 of FIG. 7). In contrast, when determining that the script is appropriate, the center-side script analyzing section 102 composes, as a normal reply, an outbound message containing the script and wirelessly transmits the composed message to a vehicle 300 via the center communication device 103 (step S15 of FIG. 5, step S24 of FIG. 6, step S35 of FIG. 7).

The vehicle 300 includes an in-vehicle communication device 310, which wirelessly transmits and receives various kinds of information including the outbound message to and from the center 100. When receiving a message sent from the center 100 via a communication section 311, the in-vehicle communication device 310 extracts a script from the received message and temporarily stores the script in a script storage section 312. The in-vehicle communication device 310 then inputs the stored script to a vehicle-side script analyzing section 313. The communication section 311 of the in-vehicle communication device 310, the script storage section 312, the vehicle-side script analyzing section 313, a script interpretation section 314, a vehicle network communication section 315, and a vehicle data storage section 316 can be constituted by various types of circuits. For example, these sections may be configured by a communication circuit, a script storage circuit, a vehicle-side script analyzing circuit, a script interpretation circuit, a vehicle network communication circuit, and a vehicle data storage circuit.

Figure 8:
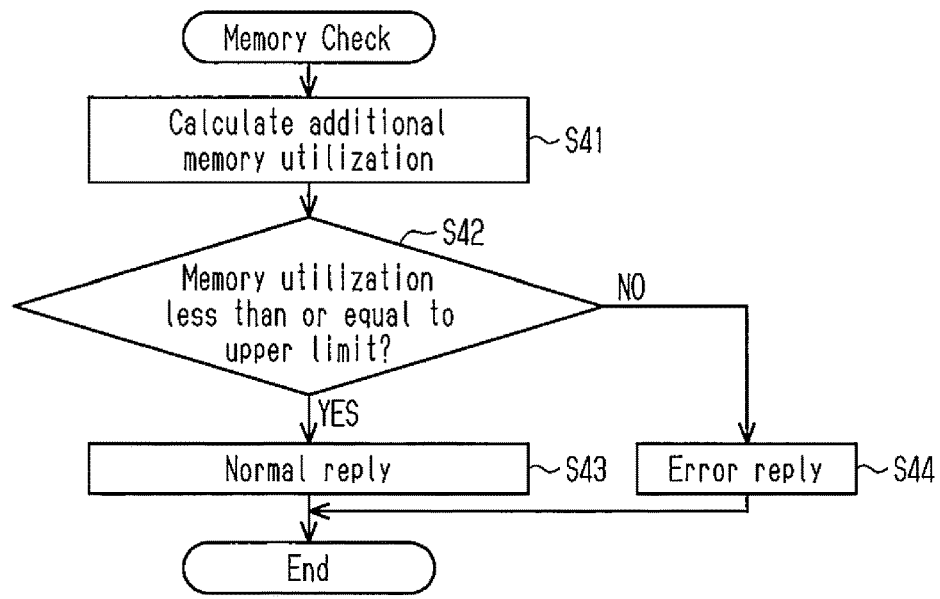
FIG. 8 is a flowchart showing a procedure for a memory check performed by the remote vehicle data collection system according to the embodiment.

The vehicle-side script analyzing section 313 is a vehicle-side checking section, which analyzes whether the resources of the vehicle will be properly maintained even if the vehicle data is collected based on the condition designated by the input script. Specifically, the vehicle-side script analyzing section 313 analyzes, as one type of the vehicle resources, the amount of space of the memory for temporarily storing data when the in-vehicle communication device 310 collects vehicle data (FIG. 8). At this time, the vehicle-side script analyzing section 313 first calculates an additional memory utilization required for executing the script based on [Expression 1] shown below (step S41 of FIG. 8).

Additional memory utilization=[Size of area for executing script]+[Total size of trigger variables]+[Temporarily stored data size]  [Expression 1]

The "size of area for executing script" refers to the data size of the file storing the script. The "total size of trigger variables" refers to the sum of the data sizes of the vehicle data used as a variable A1 in the conditional expression AA, which is used when vehicle data is collected. The "temporarily storing data size" refers to the sum of the data sizes of the following items [D1] to [D3].

[D1] Temporarily stored data size of the CAN data that has been designated to be collected by the script

[D2] Temporarily stored data size of the ECU internal value collected by CAN calibration protocol (CCP)

[D3] Temporarily stored data size of the ECU internal value collected through diagnosis communication The CCP is a type of protocol that is used to synchronize (calibrate) the ECU internal values of in-vehicle ECUs connected to the vehicle network NW. Execution of the calibration defined by the CCP subjects the ECU internal values to temporal synchronization. The ECU internal values are then obtained from the in-vehicle ECUs through the diagnosis communication.

Subsequently, the vehicle-side script analyzing section 313 adds the calculated additional memory utilization to the current memory utilization and determines whether the resultant memory utilization is greater than or equal to a predetermined upper limit of memory utilization (step S42 of FIG. 8).

When determining that the memory utilization surpasses the upper limit, that is, the memory utilization is not less than or equal to the upper limit (NO at step S42 of FIG. 8), the vehicle-side script analyzing section 313 obtains an analysis result that the vehicle resources will not be properly maintained if the vehicle data is collected based on the condition designated by the script. As a result, the vehicle-side script analyzing section 313 outputs, to the external terminal 200 via the communication section and the center communication device 103, an error reply indicating that the vehicle data should not be collected based on the condition designated by the script (step S44 of FIG. 8).

In contrast, when determining that the memory utilization is less than or equal to the upper limit (YES at step S42 of FIG. 8), the vehicle-side script analyzing section 313 obtains an analysis result that the vehicle resources will be properly maintained even if the vehicle data is collected based on the condition designated by the script. As a result, the vehicle-side script analyzing section 313 delivers, as a normal reply, the analyzed script to the script interpretation section 314 to start collection of the vehicle data based on the condition designated by the script (step S43 of FIG. 8).

Figure 9:
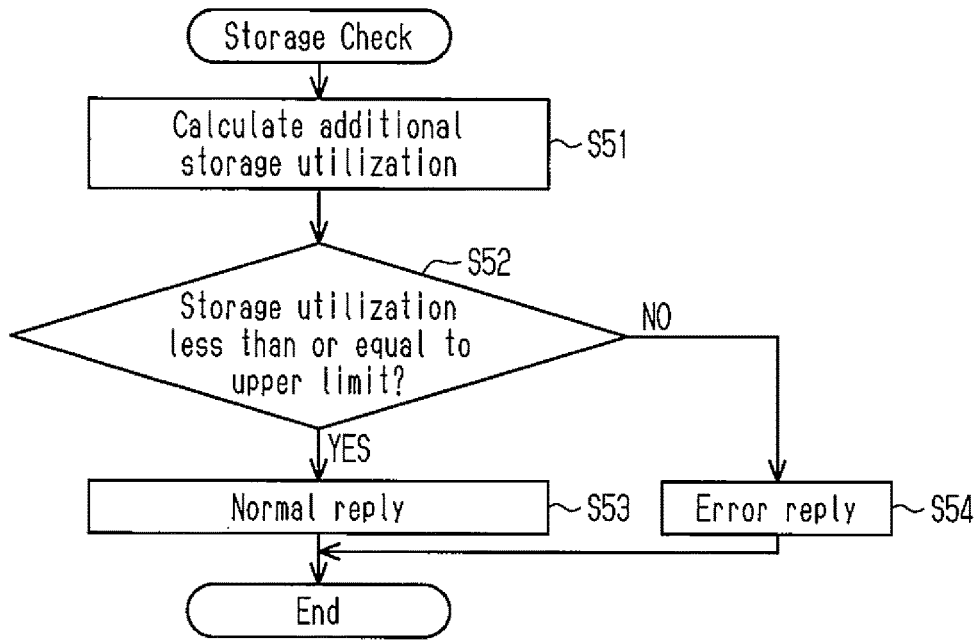
FIG. 9 is a flowchart showing a procedure for a storage check performed by the remote vehicle data collection system according to the embodiment.

The vehicle-side script analyzing section 313 also analyzes, as one type of the vehicle resources, the amount of space of the storage for storing vehicle data collected by the in-vehicle communication device 310 (FIG. 9). At this time, the vehicle-side script analyzing section 313 calculates additional storage utilization required for executing the script (step S51 of FIG. 9). The additional storage utilization refers to the total data amount of the following items [D4] to [D6].

[D4] Data amount of the CAN data that has been designated to be collected by the script.

[D5] The amount of data of the ECU internal value collected by the CCP.

[D6] Data amount of the ECU internal value collected by the diagnosis communication The vehicle-side script analyzing section 313 adds the calculated additional storage utilization to the current storage utilization and determines whether the resultant storage utilization is greater than or equal to a predetermined upper limit of storage utilization (step S52 of FIG. 9).

When determining that the storage utilization surpasses the upper limit, that is, the storage utilization is not less than or equal to the upper limit (NO at step S52 of FIG. 9), the vehicle-side script analyzing section 313 obtains an analysis result that the vehicle resources will not be properly maintained if the vehicle data is collected based on the condition designated by the script. As a result, the vehicle-side script analyzing section 313 outputs, to the external terminal 200 via the communication section and the center communication device 103, an error reply indicating that the vehicle data should not be collected based on the condition designated by the script (step S54 of FIG. 9).

In contrast, when determining that the storage utilization is less than or equal to the upper limit (YES at step S52 of FIG. 9), the vehicle-side script analyzing section 313 obtains an analysis result that the vehicle resources will be properly maintained even if the vehicle data is collected based on the condition designated by the script. As a result, the vehicle-side script analyzing section 313 delivers, as a normal reply, the analyzed script to the script interpretation section 314 to start collection of the vehicle data based on the condition designated by the script (step S53 of FIG. 9).

Figure 10:
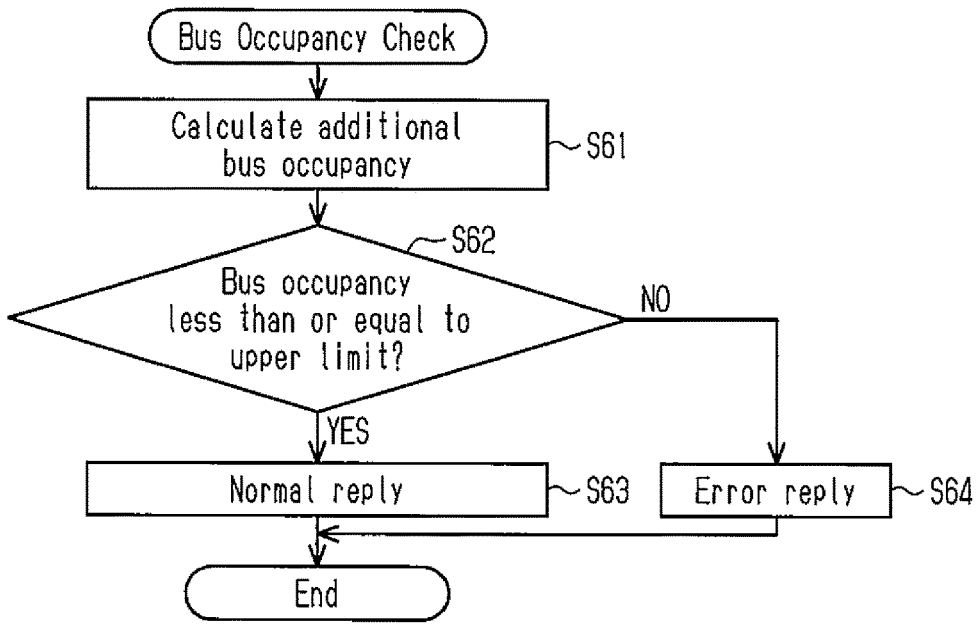
FIG. 10 is a flowchart showing a procedure for a bus occupancy check performed by the remote vehicle data collection system according to the embodiment.

The vehicle-side script analyzing section 313 analyzes, as one type of the vehicle resources, the bus occupancy of the vehicle network when the vehicle data is collected (FIG. 10). At this time, the vehicle-side script analyzing section 313 calculates additional bus occupancy required for executing the script (step S61 of FIG. 10). The additional bus occupancy refers to the total data amount of the following items [D7] to [D8].

[D7] The bus occupancy when the CCP collects ECU internal values

[D8] The bus occupancy when the diagnosis communication collects ECU internal values The vehicle-side script analyzing section 313 adds the calculated additional bus occupancy to the bus occupancy and determines whether the resultant bus occupancy is greater than or equal to a predetermined upper limit of bus occupancy (step S62 of FIG. 10).

When determining that the bus occupancy surpasses the upper limit, that is, the bus occupancy is not less than or equal to the upper limit (NO at step S62 of FIG. 10), the vehicle-side script analyzing section 313 obtains an analysis result that the vehicle resources will not be properly maintained if the vehicle data is collected based on the condition designated by the script. As a result, the vehicle-side script analyzing section 313 outputs, to the external terminal 200 via the communication section and the center communication device 103, an error reply indicating that the vehicle data should not be collected based on the condition designated by the script (step S64 of FIG. 10).

In contrast, when determining that the bus occupancy is less than or equal to the upper limit (YES at step S62 of FIG. 10), the vehicle-side script analyzing section 313 obtains an analysis result that the vehicle resources will be properly maintained even if the vehicle data is collected based on the condition designated by the script. As a result, the vehicle-side script analyzing section 313 delivers, as a normal reply, the analyzed script to the script interpretation section 314 to start collection of the vehicle data based on the condition designated by the script (step S63 of FIG. 10).

The script interpretation section 314 sequentially reads and executes the instructions in the script, thereby collecting vehicle data based on the condition designated by a script via the vehicle network communication section 315.

The vehicle network communication section 315 is connected to vehicle ECUs, or in-vehicle computers, which control operations of various vehicle-mounted devices, via the vehicle network NW. The vehicle ECUs include, for example, a body circuit serving as a body ECU 320, which controls operation of electric components such as windows and doors of the vehicle, and a brake circuit serving as a brake ECU 321, which controls operation of the brakes. The body ECU 320 is connected to an engine switch 322, which is manipulated for switching the power mode of the engine among the ignition (IG) mode, the ACC mode, and the OFF mode. The brake ECU 321 is connected to a vehicle speed sensor 323, which detects the speed of the vehicle 300, and a brake sensor 324, which detects the amount of depression of the brake pedal by the driver.

The vehicle network communication section 315 has an information collection table T2, which defines the relationship between the type of vehicle data to be collected and network identification values of the vehicle ECUs from which the vehicle data is collected.

Figures 3, 4:
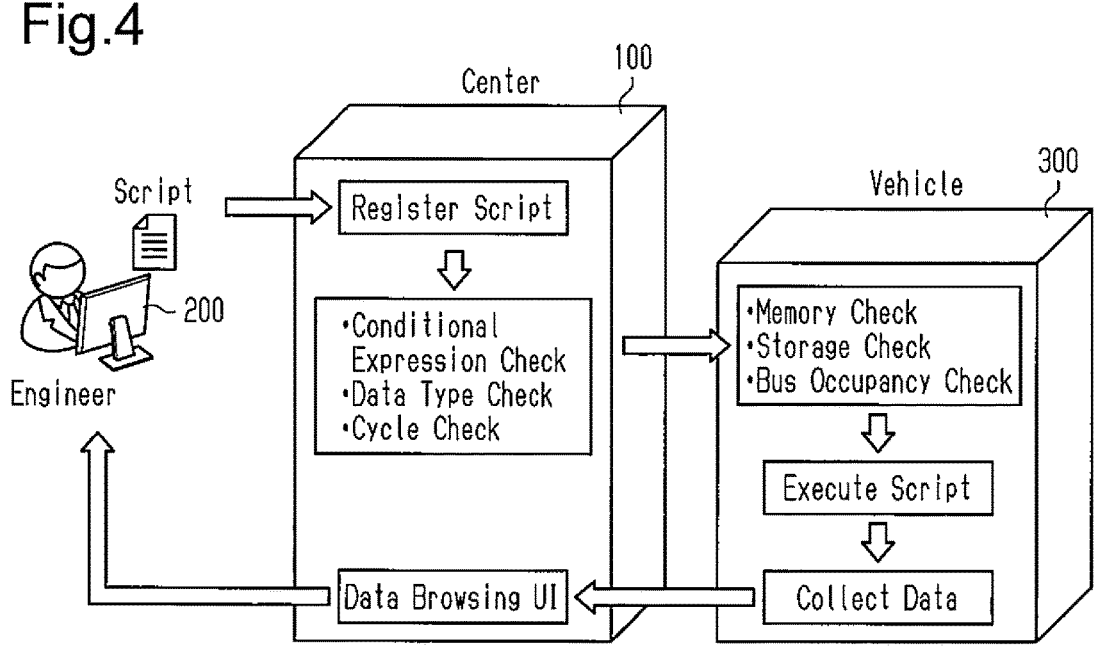
FIG. 3 is a diagram showing an example of the content of prescriptions on the information collection table.
FIG. 4 is a diagram showing the flow of processing executed for collecting vehicle data by the remote vehicle data collection system according to the embodiment.

For example, as shown in FIG. 3, the information collection table T2 of the present embodiment is associated with the brake ECU, which is a vehicle ECU from which vehicle data such as the vehicle speed and the brake pedal depression amount are obtained. The brake ECU is associated with a CAN-ID1, which is a network identification value. The information collection table T2 is also associated with the body ECU, which is a vehicle ECU from which vehicle data such as the number of times that the ignition switch is turned on (number of times of IG-ON) is obtained. The body ECU is associated with a CAN-ID2, which is a network identification value.

Thus, in the present example, if a script designates, as the types of vehicle data to be collected, the vehicle speed and the number of times of IG-ON, the vehicle network communication section 315 identifies, from the information collection table T2, the CAN-ID1 and the CAN-ID2 as the network identification values associated with the vehicle data to be collected. The vehicle network communication section 315 identifies the brake ECU and the body ECU, from which the vehicle data is to be obtained, based on the identified network identification values, and collects vehicle data such as the vehicle speed and the number of times of IG-ON via the vehicle network NW.

As shown in FIG. 1, the vehicle network communication section 315 stores the vehicle data collected via the vehicle network NW in a vehicle data storage section 316, which functions as the above described storage. The vehicle data stored in the vehicle data storage section 316 is transmitted to the center communication device 103 from the in-vehicle communication device 310 and is temporarily stored in the vehicle data storage section 104 of the center 100. The vehicle data is then read by the external terminal 200.

Next, operation of the remote vehicle data collection system according to the present embodiment will now be described with reference to FIG. 4.

As shown in FIG. 4, when a script is input, for example, by an engineer through the external terminal 200, the input script is registered at the center 100. Appropriateness of the registered script is checked on the part of the center 100 by referring to the collectable data table T1. The checking operation for appropriateness of the script includes a conditional expression check, which is a check for appropriateness of the conditional expression AA used when collecting vehicle data, a data type check, which is a check for appropriateness of the type of vehicle data to be collected, and a cycle check, which is a check for the checking cycle and the sampling cycle when collecting the vehicle data. In the present embodiment, the collection condition for collecting vehicle data is designated with a high flexibility through inputting of scripts. This widens varieties of the types of the variable A1, which is designated as the determination factor for the conditional expression AA, and the vehicle data type B to be collected. Thus, the data amount of the collectable data table T1 is inevitably great, so that the collectable data table T1 cannot be managed on the part of the vehicle 300, which has a limited storage capacity. Therefore, the table T1 is managed on the part of the center 100, which has a relatively ample storage capacity. When appropriateness of a script is checked by referring to the collectable data table T1, the information of the collectable data table T1 is processed within the center 100 and is not transmitted between the center 100 and the vehicle 300.

After the script is checked for appropriateness on the part of the center 100, the resources of the vehicle when the vehicle data is collected based on the condition designated by the script is checked on the part of the vehicle. The check for the resources of the vehicle includes a memory check, which is a check for the amount of space in the memory of the in-vehicle communication device 310, a storage check, which is a check for the amount of space in the storage of the in-vehicle communication device 310, and a bus occupancy check, which is a check for the bus occupancy of the vehicle network NW. When the resources of the vehicle 300 is checked, the information of the resources of the vehicle 300 at the time is obtained on the part of the vehicle 300 and is not transmitted between the center 100 and the vehicle 300.

After the resources of the vehicle are checked on the part of the vehicle 300, the vehicle data is collected based on the condition designated by the scrip on the part of the vehicle 300 as the script is executed. After being delivered to the center 100 from the vehicle 300, the collected vehicle data is displayed on the external terminal 200 by a data browsing user interface (UI) in the center 100.

As described above, the above described embodiment has the following advantages.

(1) The center 100 is configured to check appropriateness of the conditional expression AA, the vehicle data type B, the checking cycle of the conditional expression AA, and the sampling cycle of the vehicle data, based on the collectable data table T1 stored in the center 100. In contrast, the vehicle 300 is configured to check appropriateness of the resources of the vehicle when the vehicle data is collected based on the condition designated by the script. Therefore, in any of the above checking operations, transmission between the vehicle 300 and the center 100 is not necessary. Thus, the vehicle data is reliably collected in response to a request via the center 100, while suppressing influences on the communication environment of the vehicle 300.

(2) In the collectable data table T1 stored in the center 100, the type of the vehicle 300 and the vehicle data type B collectable for each vehicle type are associated with each other. This allows the center 100 to check, using the collectable data table T1, whether the vehicle data type B that has been designated to be collected by the script is collectable by the vehicle 300.

(3) In the collectable data table T1 stored in the center 100, the range of possible values of the vehicle data is associated with the type B of vehicle data. This allows the center 100 to check, using the collectable data table T1, whether the conditional expression AA designated by the script is appropriate for the vehicle 300.

(4) In the collectable data table T1 stored in the center 100, the settable lower limits Tc1, Tc2 for the checking cycle are associated with the variable A1 of the conditional expression AA. This allows the center 100 to check, using the collectable data table T1, whether the checking cycle designated by the script is appropriate for the vehicle 300.

(5) In the collectable data table T1 stored in the center 100, the settable lower limits Ts1, Ts2, Ts3 for the sampling cycle are associated with the vehicle data type B. This allows the center 100 to check, using the collectable data table T1, whether the sampling cycle designated by the script is appropriate for the vehicle 300.

(6) Prior to execution of collection of the vehicle data, the amount of space of the memory and the storage in the in-vehicle communication device 310 are checked on the part of the vehicle 300. This allows the vehicle data to be reliably collected in response to a request via the center 100.

(7) Prior to execution of collection of the vehicle data, the bus occupancy of the vehicle network NW is checked on the part of the vehicle 300. This allows the vehicle data to be reliably and quickly collected in response to a request via the center 100.

(8) The collection condition of vehicle data is designated by the script, which describes multiple commands to be executed at the collection of vehicle data. Thus, highly flexible setting of condition for collecting vehicle data is achieved through input of the script. Since such input of the script broadens the variety of the conditional expression AA, the vehicle data type B, the sampling cycle, and the checking cycle, which can be prescribed to the vehicle 300, appropriateness of these prescribed items is likely to be a problem in the vehicle 300. Further, the data size of the script and the processing load at execution of the script are also widely varied. Thus, when vehicle data is collected based on the collection condition prescribed by the script, whether the resources of the subject vehicle will be properly maintained is likely to be a problem. In this regard, with the above illustrated embodiment, since a checking operation is performed before vehicle data is collected based on the collection condition prescribed by the script, neither of the above mentioned problems is likely to occur.

(9) The vehicle 300 includes multiple vehicle ECUs, which are connected to each other by the vehicle network NW configured by CAN, and the vehicle data is collected from the vehicle ECUs through communication specified by the CAN protocol. Thus, the vehicle data can be collected from the vehicle ECUs by using the versatile CAN protocol, which is widely used in vehicles 300.

The above described embodiment may be modified as follows.

In the above illustrated embodiment, the resources of the vehicle to be checked by the vehicle 300 may include the amount of space of the memory and the storage in a vehicle ECU from which vehicle data is obtained.

In the above illustrated embodiment, the present disclosure is applicable to a case in which the resources of the vehicle to be checked by the vehicle 300 include only part of the amount of space of the memory and the storage mounted on the vehicle 300 and the bus occupancy of the vehicle network NW.

In the above illustrated embodiment, the present disclosure is applicable to a case in which the items to be checked by the center 100 include only part of the conditional expression AA used when collecting vehicle data, the vehicle data type B to be collected, and the checking cycle and the sampling cycle when collecting vehicle data.

In the above illustrated embodiment, the communication standard of the vehicle network NW, which forms the collection path of vehicle data, is not limited to CAN. The present disclosure is applicable to a case in which another communication standard such as FlexRay (registered trademark) or ethernet is used.

What is claimed is:

1. A remote vehicle data collection system, comprising:
A subject vehicle;
a center including a center processor that manages traveling information of a plurality of vehicles and a center memory/storage storing a program performed by the center processor, wherein
the center processor is configured to prescribe, based on an input from an external terminal, to a subject vehicle through wireless communication, at least one of a type of vehicle data to be collected, a conditional expression with a determination factor used when collecting the vehicle data, a sampling cycle when collecting the vehicle data, and a checking cycle of the conditional expression with the determination factor,
the center processor is configured to read, through wireless communication, the vehicle data collected based on the prescription,
the center processor includes a check criterion,
the center processor is configured to check, based on the check criterion, appropriateness of the at least one of the type of the vehicle data, the conditional expression with the determination factor, the sampling cycle, and the checking cycle that is prescribed to the subject vehicle and is set based on the input from the external terminal to collect the vehicle data,
the subject vehicle includes a vehicle electronic control unit (ECU) and a vehicle processor, which is configured to check whether resources of the subject vehicle are appropriate,
the vehicle processor is configured to check whether the resources of the subject vehicle are appropriate when the vehicle data is collected based on the prescription from the center, and
a lower limit of the sampling cycle is set for each item of the vehicle data to improve reliability of operation of the vehicle ECU of the subject vehicle, wherein
the center has a database as the check criterion,
the database is configured to associate the type of the subject vehicle with a type of vehicle data that is collectable in a vehicle of the type of the subject vehicle,
the center processor is configured to identify, based on the database, a type of vehicle data that corresponds to the type of the subject vehicle, and
the center processor is configured to determine that the type of the vehicle data is appropriate on condition that the identified type of vehicle data agrees with the type of the vehicle data that has been prescribed as a subject to be collected to the subject vehicle, wherein
the database is configured to associate a settable range of the checking cycle with the conditional expression with the determination factor,
the center processor is configured to identify, based on the database, the settable range of the checking cycle in the conditional expression with the determination factor that corresponds to the type of the subject vehicle, and
the center processor is configured to determine that the checking cycle is appropriate on condition that the checking cycle prescribed to the subject vehicle is within the identified range.

2. The remote vehicle data collection system according to claim 1, wherein
the database is configured to associate a range of possible values of the vehicle data with the type of the vehicle data,
the center processor is configured to identify, based on the database, a range of possible values of the vehicle data to be collected from the type of the subject vehicle, and
the center processor is configured to determine that the conditional expression with the determination factor of the vehicle data is appropriate on condition that a data value range of the vehicle data that satisfies the conditional expression with the determination factor prescribed to the subject vehicle is within the identified range.

3. The remote vehicle data collection system according to claim 1, wherein
the subject vehicle has at least one of a memory and a storage, and
the resources of the subject vehicle checked by the vehicle processor are configured to include an amount of space in the at least one of the memory and the storage.

4. The remote vehicle data collection system according to claim 1, wherein
the subject vehicle has a vehicle network, and
the resources of the subject vehicle checked by the vehicle processor are configured to include a bus occupancy of the vehicle network.

5. The remote vehicle data collection system according to claim 1, wherein a script that describes one or more commands is configured to designate a collection condition of the vehicle data.

6. The remote vehicle data collection system according to claim 1, wherein
the subject vehicle includes a plurality of vehicle mounted control devices, which are connected to a controller area network (CAN), and
one or more of the vehicle mounted control devices are configured to collect the vehicle data through communication specified by the CAN protocol.

7. A remote vehicle data collection system, comprising:
a subject vehicle;
a center including a center processor that manages traveling information of a plurality of vehicles and a center memory/storage storing a program performed by the center processor, wherein
the center processor is configured to prescribe, based on an input from an external terminal, to a subject vehicle through wireless communication, at least one of a type of vehicle data to be collected, a conditional expression with a determination factor used when collecting the vehicle data, a sampling cycle when collecting the vehicle data, and a checking cycle of the conditional expression with the determination factor,
the center processor is configured to read, through wireless communication, the vehicle data collected based on the prescription,
the center processor includes a check criterion,
the center processor is configured to check, based on the check criterion, appropriateness of the at least one of the type of the vehicle data, the conditional expression with the determination factor, the sampling cycle, and the checking cycle that is prescribed to the subject vehicle and is set based on the input from the external terminal to collect the vehicle data,
the subject vehicle includes a vehicle electronic control unit (ECU) and a vehicle processor, which is configured to check whether resources of the subject vehicle are appropriate,
the vehicle processor is configured to check whether the resources of the subject vehicle are appropriate when the vehicle data is collected based on the prescription from the center, and
a lower limit of the sampling cycle is set for each item of the vehicle data to improve reliability of operation of the vehicle ECU of the subject vehicle, wherein
the center has a database as the check criterion,
the database is configured to associate the type of the subject vehicle with a type of vehicle data that is collectable in a vehicle of the type of the subject vehicle,
the center processor is configured to identify, based on the database, a type of vehicle data that corresponds to the type of the subject vehicle, and
the center processor is configured to determine that the type of the vehicle data is appropriate on condition that the identified type of vehicle data agrees with the type of the vehicle data that has been prescribed as a subject to be collected to the subject vehicle, wherein
the database is configured to associate a settable range of the sampling cycle with the type of the vehicle data,
the center processor is configured to identify, based on the database, the settable range of the sampling cycle for the type of the vehicle data that corresponds to the type of the subject vehicle, and the center processor is configured to determine that the sampling cycle is appropriate on condition that the sampling cycle prescribed to the subject vehicle is within the identified range.

8. A controlling method of a remote vehicle data collection system, comprising a center including a center processor that manages traveling information of a plurality of vehicles and a center memory/storage storing a program performed by the center processor, wherein the method comprising:

by the center processor, prescribing to a subject vehicle through wireless communication, at least one of a type of vehicle data to be collected, a conditional expression with a determination factor used when collecting the vehicle data, a sampling cycle when collecting the vehicle data, and a checking cycle of the conditional expression with the determination factor based on an input from an external terminal;

by the center processor, reading through wireless communication, the vehicle data collected based on the prescription;

by the center processor, including a check criterion, checking based on the check criterion, appropriateness of the at least one of the type of the vehicle data, the conditional expression with the determination factor, the sampling cycle, and the checking cycle that is prescribed to the subject vehicle and is set based on the input from the external terminal to collect the vehicle data;

by the subject vehicle, including a vehicle electronic control unit (ECU) and a vehicle processor, which is configured to check whether resources of the subject vehicle are appropriate; and by the vehicle processor, checking whether the resources of the subject vehicle are appropriate when the vehicle data is collected based on the prescription from the center processor, wherein a lower limit of the sampling cycle is set for each item of the vehicle data to improve reliability of operation of the vehicle ECU of the subject vehicle, wherein by the center, having a database as the check criterion, the database is configured to associate the type of the subject vehicle with a type of vehicle data that is collectable in a vehicle of the type of the subject vehicle, the database is configured to associate a settable range of the checking cycle with the conditional expression, by the center processor, identifying, based on the database, a type of vehicle data that corresponds to the type of the subject vehicle, and by the center processor, determining that the type of the vehicle data is appropriate on condition that the identified type of vehicle data agrees with the type of the vehicle data that has been prescribed as a subject to be collected to the subject vehicle, wherein by the center processor, identifying, based on the database, the settable range of the checking cycle in the conditional expression with the determination factor that corresponds to the type of the subject vehicle, and by the center processor, determining that the checking cycle is appropriate on condition that the checking cycle prescribed to the subject vehicle is within the identified range.

* * * * *